(12) United States Patent  (10) Patent No.: US 8,934,074 B2
Jeon et al.  (45) Date of Patent: Jan. 13, 2015

(54) ECB-LCD HAVING AN EXCELLENT VIEWING ANGLE AND COLOR CHARACTERISTICS

(75) Inventors: Byoung-Kun Jeon, Daejeon (KR); Su-Young Ryu, Daejeon (KR); Moon-Soo Park, Daejeon (KR); Sang-Jun Yoon, Seoul (KR)

(73) Assignee: LG Chem, Ltd., Seoul (KR)

( * ) Notice: Subject to any disclaimer, the term of this patent is extended or adjusted under 35 U.S.C. 154(b) by 212 days.

(21) Appl. No.: 13/634,794

(22) PCT Filed: Jul. 15, 2011

(86) PCT No.: PCT/KR2011/005241
§ 371 (c)(1),
(2), (4) Date: Sep. 13, 2012

(87) PCT Pub. No.: WO2012/008802
PCT Pub. Date: Jan. 19, 2012

(65) Prior Publication Data
US 2012/0327335 A1  Dec. 27, 2012

(30) Foreign Application Priority Data
Jul. 15, 2010 (KR) ........................ 10-2010-0068704

(51) Int. Cl.
*G02F 1/13363* (2006.01)
*G02F 1/139* (2006.01)

(52) U.S. Cl.
CPC .......... *G02F 1/13363* (2013.01); *G02F 1/1393* (2013.01); *G02F 2001/133633* (2013.01); *G02F 2413/02* (2013.01)
USPC ........................................................ 349/119

(58) Field of Classification Search
CPC ............ G02F 2413/02; G02F 2413/05; G02F 2413/105
USPC ........................................................ 349/119
See application file for complete search history.

(56) References Cited

U.S. PATENT DOCUMENTS

| 6,064,457 | A * | 5/2000 | Aminaka ....................... 349/117 |
| 6,867,834 | B1 * | 3/2005 | Coates et al. ................. 349/119 |
| 7,746,426 | B2 | 6/2010 | Kim et al. |
| 8,169,573 | B2 | 5/2012 | Nam |
| 2005/0140880 | A1 | 6/2005 | Lee et al. |
| 2008/0180605 | A1 | 7/2008 | Kim |
| 2011/0051050 | A1 | 3/2011 | Shin et al. |

FOREIGN PATENT DOCUMENTS

| CN | 1550796 A | 12/2004 |
| CN | 1693959 A | 11/2005 |

(Continued)

*Primary Examiner* — James Dudek
(74) *Attorney, Agent, or Firm* — McKenna Long & Aldridge, LLP

(57) ABSTRACT

There is provided an electrically controllable birefringence liquid crystal display (ECB-LCD) device, including: a liquid crystal panel including a first substrate, a second substrate, and a liquid crystal cell interposed between the first substrate and the second substrate and including a liquid crystal having positive dielectric anisotropy, the liquid crystal cell having a cell gap of 1 to 5 μm and operating in an ECB mode; a first polarizer disposed on an upper portion of the first substrate and having a first absorption axis; a second polarizer disposed on a lower portion of the second substrate and having a second absorption axis; a first liquid crystal film interposed between the first substrate and the first polarizer; and a second liquid crystal film interposed between the second substrate and the second polarizer; wherein the first liquid crystal film includes a first base substrate; and a first liquid crystal layer formed on a surface of the first base substrate and including a nematic liquid crystal splay-aligned such that a maximum tilt angle is 20° to 90° from an in-plane direction to a thickness direction; and wherein the second liquid crystal film includes a second base substrate; and a second liquid crystal layer formed on a surface of the second base substrate and including a horizontally aligned nematic liquid crystal.

22 Claims, 2 Drawing Sheets

(56) References Cited

FOREIGN PATENT DOCUMENTS

| JP | 2008-139368 | 6/2008 |
| JP | 2011-511957 | 4/2011 |
| KR | 10-2005-0070616 | 7/2005 |
| KR | 10-2006-0123922 | 12/2006 |
| KR | 10-2007-0087362 | 8/2007 |
| KR | 10-2007-0088947 | 8/2007 |
| KR | 10-2008-0035087 | 4/2008 |

* cited by examiner

ECB-LCD HAVING AN EXCELLENT VIEWING ANGLE AND COLOR CHARACTERISTICS This application is a National Stage Entry of International Application No. PCT/KR2011/005241, filed Jul. 15, 2011, and claims the benefit of Korean Application No. 10-2010-0068704, filed on Jul. 15, 2010, which is hereby incorporated by reference in its entirety for all purposes as if fully set forth herein.

TECHNICAL FIELD

The present invention relates to a translucent reflective type electrically controllable birefringence liquid crystal display (ECB-LCD), and more particularly, to an ECB-LCD having a superior viewing angle and color characteristics and incurring low production costs.

BACKGROUND ART

An ECB-LCD is a liquid crystal display electrically controlling the birefringence of a liquid crystal, and, according to the related art, is formed as a translucent reflective type unit including a transmitting unit and a reflecting unit. The transmitting unit is configured such that a screen may be seen using a backlight in dark environments, while the reflecting unit is configured such that a screen may be seen using external light in bright environments.

The translucent reflective type LCD as described above is configured such that light moves through the same light path in both a transmitting mode and a reflecting mode. To this end, an achromatic quarter wave film (AQWF) is attached between a liquid crystal panel and a polarizing plate. In this case, the achromatic quarter wave film may be formed by combining two retardation films having different phase difference values and optical axes, and the two retardation films are attached to each other such that the optical axes thereof form an angle of approximately 30° to 80°.

However, in the case of an ECB-LCD according to the related art, the retardation film attached to a polarizing plate disposed towards a light source and the retardation film attached to a polarizing plate disposed towards a viewer may respectively form different angles, and an angle between the retardation films may be very large. Therefore, when the polarizing plate is manufactured by being formed as a single plate, defects, resulting in a large loss rate of the films, a high fault rate due to a complicated manufacturing process, and high manufacturing costs have been caused.

In the related art, retardation films are generally manufactured such that the optical axes thereof are directed in a vertical direction, and each retardation film is cut at an angle formed by a polarizing plate and the optical axis of the retardation film. The cut retardation films are combined to be manufactured. For example, when a first retardation film (λ/2) forms an angle of 15° and a second retardation film (λ/4) forms an angle of 75°, with respect to an absorption axis of a polarizing plate, the two films are cut such that the optical axes thereof respectively form angles of 15° and 75° with respect to the absorption axis of the polarizing plate. In this case, since the cutting angles, with respect to the absorption axis of the polarizing plate, are respectively 15° and 75°, a large loss rate of the films may be generated, thereby causing an increase in raw material expenses and manufacturing costs.

DISCLOSURE

Technical Problem

An aspect of the present invention provides an ECB-LCD having excellent viewing angle characteristics and color characteristics while being easily manufactured and incurring low manufacturing costs due to a simple structure thereof.

Technical Solution

According to an aspect of the present invention, there is provided an electrically controllable birefringence liquid crystal display (ECB-LCD) device, including: a liquid crystal panel including a first substrate, a second substrate, and a liquid crystal cell interposed between the first substrate and the second substrate and including a liquid crystal having positive dielectric anisotropy, the liquid crystal cell having a cell gap of 1 to 5 μm and operating in an ECB mode; a first polarizer disposed on an upper portion of the first substrate and having a first absorption axis; a second polarizer disposed on a lower portion of the second substrate and having a second absorption axis; a first liquid crystal film interposed between the first substrate and the first polarizer; and a second liquid crystal film interposed between the second substrate and the second polarizer; wherein the first liquid crystal film includes a first base substrate; and a first liquid crystal layer formed on a surface of the first base substrate and including a nematic liquid crystal splay-aligned such that a maximum tilt angle is 20° to 90° from an in-plane direction to a thickness direction; and wherein the second liquid crystal film includes a second base substrate; and a second liquid crystal layer formed on a surface of the second base substrate and including a horizontally aligned nematic liquid crystal.

The first base substrate or the second base substrate may be a uniaxial retardation film, a negative biaxial retardation film, or an isotropic film. The uniaxial retardation film may be one selected from a group consisting of a uniaxially stretched cyclo olefin polymer (COP) film, a uniaxially stretched polycarbonate (PC) film, and a uniaxially stretched acrylate film. The negative biaxial retardation film may be one selected from a group consisting of a biaxially stretched COP film, a uniaxially stretched triacetyl cellulose (TAC) film, a biaxially stretched polycarbonate (PC) film and a biaxially stretched poly methyl methacrylate (PMMA) film. The isotropic film may one selected from a group consisting of a non-stretched COP film, a non-stretched acrylate film, and a non-stretched PMMA film.

Meanwhile, in the case of using the uniaxial retardation film as the first base substrate and/or the second substrate, the uniaxial retardation film may have an in-plane retardation value of approximately 200 nm to 300 nm at a wavelength of 550 nm.

In addition, in the case of using the negative biaxial retardation film as the first base substrate and/or the second substrate, the negative biaxial retardation film may have an in-plane retardation value of approximately 200 nm to 300 nm and a thickness direction retardation value of approximately −5 nm to −100 nm at a wavelength of 550 nm.

Meanwhile, an in-plane retardation value of the first liquid crystal layer may be approximately 50 nm to 150 nm, and an in-plane retardation value of the second liquid crystal layer may be approximately 50 nm to 150 nm.

In this case, axes of the first base substrate and the first liquid crystal layer may form an angle of 40° to 80° or −40° to −80°. Axes of the second base substrate and the second liquid crystal layer may form an angle of 40° to 80° or −40° to −80°.

Meanwhile, an alignment layer may be further included between the first base substrate and the first liquid crystal layer and/or the second base substrate and the second liquid crystal layer. In this case, the alignment layer may be an acrylic alignment layer or a photo alignment layer including polynorbornene-based cyanate or polyimide-based cyanate.

Meanwhile, an inner protective film may be inserted between the first polarizer and the first liquid crystal film and between the second polarizer and the second liquid crystal film.

According to another aspect of the present invention, there is provided a An electrically controllable birefringence liquid crystal display (ECB-LCD) device, comprising: a liquid crystal panel including a first substrate, a second substrate, and a liquid crystal cell interposed between the first substrate and the second substrate and including a liquid crystal having positive dielectric anisotropy, the liquid crystal cell having a cell gap of 1 to 5 µm and operating in an ECB mode; a first polarizer disposed on an upper portion of the first substrate and having a first absorption axis; a second polarizer disposed on a lower portion of the second substrate and having a second absorption axis; a first liquid crystal film interposed between the first substrate and the first polarizer; and a second liquid crystal film interposed between the second substrate and the second polarizer; wherein the first liquid crystal film includes a first base substrate made of a uniaxial retardation film having an in-plane retardation value of 200 nm to 300 nm at a wavelength of 550 nm; and a first liquid crystal layer including a nematic liquid crystal splay-aligned on the first base substrate such that a maximum tilt angle is 20° to 90° from an in-plane direction to a thickness direction, and having an optical axis which forms an angle of 40° to 80° or −40° to −80° with respect to an optical axis of the first base substrate and an in-plane retardation value of 50 nm to 150 nm; and wherein the second liquid crystal film includes a second base substrate made of a uniaxial retardation film having an in-plane retardation value of 200 nm to 300 nm at a wavelength of 550 nm; and a second liquid crystal layer including a horizontally aligned nematic liquid crystal on the second base substrate, and having an optical axis which forms an angle of 40° to 80° or −40° to −80° with respect to an optical axis of the second base substrate and an in-plane retardation value of 50 nm to 150 nm.

Meanwhile, an inner protective film may be inserted between the first polarizer and the first liquid crystal film and between the second polarizer and the second liquid crystal film.

Advantageous Effects

An ECB-LCD according to the present invention could have a simple structure to allow for easy manufacturing thereof, have a superior competitive price due to incurring low manufacturing costs, and have superior viewing angle and color characteristics, as compared to that of the related art.

REFERENCE NUMERALS

10: liquid crystal panel
20: first polarizer
30: second polarizer
40: first liquid crystal film
50: second liquid crystal film

BEST MODE

Hereinafter, the present invention will be explained in detail with reference to the drawings.

Figure 1:
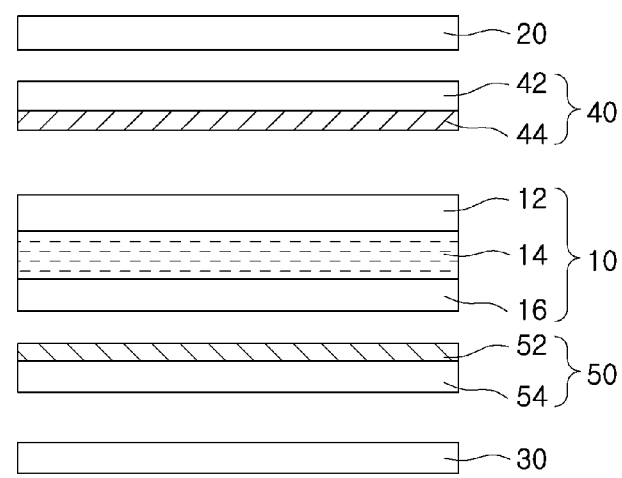
FIG. 1 is a diagram showing a configuration of an ECB-LCD according to the present invention.

FIG. 1 schematically illustrates a configuration of an electrically controllable birefringence liquid crystal display (ECB-LCD) according to the present invention. As illustrated in FIG. 1, the ECB-LCD according to the present invention may include a liquid crystal panel 10, a first polarizer 20, a second polarizer 30, a first liquid crystal film 40 and a second liquid crystal film 50.

Respective components of the ECB-LCD according to the present invention will be described in detail.

(1) Liquid Crystal Panel 10

The liquid crystal panel 10 according to the present invention is a translucent reflective type liquid crystal panel operating in an ECB mode, and is not particularly limited, as long as it is a translucent reflective type liquid crystal panel operating in a general ECB mode.

For example, the liquid crystal panel according to the present invention may include a first substrate 12 and a second substrate 16 disposed to be opposed to each other while having a predetermined interval therebetween, and a liquid crystal cell 14 interposed between the first substrate 12 and the second substrate 16. In this case, the first substrate 12 and the second substrate 16 may be provided with driving elements for driving the liquid crystal cell, such as electrodes. The liquid crystal cell 14 may have a liquid crystal having positive dielectric anisotropy ($\Delta \epsilon > 0$) injected thereinto, and a gap in the liquid crystal cell 14 may be approximately 1 to 5 µm.

(2) First Polarizer 20 and Second Polarizer 30

The first polarizer 20 is disposed on an upper portion of the first substrate 12 of the liquid crystal panel 10 and the second polarizer 30 is disposed on a lower portion of the second substrate 16 of the liquid crystal panel 10. The first polarizer 20 and the second polarizer 30 may realize light and shade by transmitting or blocking light polarized in a specific direction, according to the driving of the liquid crystal cell 14. In general, an absorption axis of the first polarizer and an absorption axis of the second polarizer are disposed to form an angle of 80° to 120°.

Meanwhile, in the present invention, the respective first polarizer 20 and the second polarizer 30 may be formed of only a polarizing film without a protective film, or may include protective film(s) attached to a surface or two surface thereof. In this case, as the protective film, a protective film generally used in the related art may be used, for example, a TAC film, a PE film, a PET film, or the like.

(3) First Liquid Crystal Film 40 and Second Liquid Crystal Film 50

The first liquid crystal film 40 and the second liquid crystal film 50 are compensation films for compensating for viewing angle and color characteristics of the ECB-LCD, simultaneously with implementing a translucent reflection function. The translucent reflection function may be implemented by combining a λ/2 retardation plate and a λ/4 retardation plate. Meanwhile, in the case of an ECB-LCD, viewing angle characteristics may be degraded due to light leakage at a tilt angle in a dark state. The light leakage may be generated due to the liquid crystal cell and the polarizing plate not being in an orthogonal state at the tilt angle. When the light leakage is generated, a contrast ratio may be degraded and color changes may be caused to thereby lead to degradation in viewing angle characteristics. Thus, in the present invention, the first liquid crystal film 40 and the second liquid crystal film 50, capable of performing a viewing angle compensation function, are inserted between the respective polarizer and the liquid crystal cell, such that the above-defects are resolved.

In the present invention, two types of liquid crystal films are used. One liquid crystal film inserted between the first polarizer and the first substrate refers to a first liquid crystal film and the other liquid crystal film inserted between the second polarizer and the second substrate refers to a second liquid crystal film, for convenience.

First, the first liquid crystal film 40 will be explained. As described above, the first liquid crystal film 40 may be interposed between the first substrate 12 and the first polarizer 20, and be formed of a first base substrate 42 and a first liquid crystal layer 44 formed on a surface of the first base substrate 42.

In this case, the first base substrate 42 may be made of any one of a positive uniaxial retardation film, a negative biaxial retardation film, and an isotropic film. Meanwhile, the positive uniaxial retardation film refers to a film satisfying $n_x > n_y = n_z$; the negative biaxial retardation film refers to a film satisfying $n_x > n_y > n_z$; and the isotropic film refers to a film satisfying $n_x = n_y = n_z$, provided that a refractive index in x-axis direction is n, a refractive index in y-axis direction is $n_y$, and a refractive index in z-axis direction is $n_z$.

In this case, as the uniaxial retardation film, for example, a uniaxially stretched cyclo olefin polymer (COP) film, a uniaxially stretched polycarbonate (PC) film, or a uniaxially stretched acrylate film may be used. In the case of using the uniaxial retardation film as the first base substrate, the uniaxial retardation film may have an in-plane retardation value of approximately 200 nm to 300 nm at a wavelength of 550 nm.

Meanwhile, as the biaxial retardation film, for example, a biaxially stretched COP film, a uniaxially stretched triacetyl cellulose (TAC) film, a biaxially stretched polycarbonate (PC) film or a biaxially stretched poly methyl methacrylate (PMMA) film may be used. In the case of using the biaxial retardation film as the first base substrate, the biaxial retardation film may have an in-plane retardation value of approximately 200 nm to 300 nm and a thickness direction retardation value of approximately −5 nm to −100 nm at a wavelength of 550 nm.

As the isotropic film, for example, a non-stretched COP film, a non-stretched acrylate film, or a non-stretched PMMA film may be used.

Meanwhile, the first liquid crystal layer 44 may be formed such that a nematic liquid crystal is splay-aligned on the first base substrate 42. In the case of the splay aligned nematic liquid crystal, since a director is consecutively changed in a thickness direction, parameters capable of defining an alignment of the liquid crystal director may be required. The first liquid crystal layer may be defined as the following [Equation 1], provided that a pretilt angle of the splay aligned nematic liquid crystal refers to $\theta_1$, a maximum tilt angle thereof refers to $\theta_2$, a director profile coefficient describing the nematic liquid crystal distribution between the pretilt angle and the maximum tilt angle refers to $\alpha$, and the liquid crystal layer is formed of N layers having different director distributions.

$$\theta(i) = (d \times i/N)^\alpha \times (\theta_2 - \theta_1) + \theta_1 \quad \text{[Equation 1]}$$

Where, $\theta(i)$ indicating a tilt angle change according to thickness, refers to a tilt angle distribution at an $i^{th}$ layer when the liquid crystal layer is divided into N layers from 0 to d. For example, $\theta(3)$ refers to a tilt angle distribution at a $3^{th}$ layer when the liquid crystal layer is divided into N layers.

In [Equation 1], when a is 1, the liquid crystal director distribution (tilt angle distribution of liquid crystal molecules) may show a constant linear distribution. When $\alpha$ is less than 1, it can be seen that the liquid crystal director distribution initially smoothly increases and rapidly changes in the vicinity of a maximum tilt angle. When $\alpha$ is more than 1, it can be seen that the liquid crystal director distribution initially rapidly changes and then smoothly changes in the vicinity of the maximum tilt angle.

The liquid crystal director distribution may refer to an important value determining optical characteristics of a viewing angle compensation film in the ECB-LCD and determining an optical axis at each viewing angle as well as a retardation distribution according the angle.

Meanwhile, in the present invention, the first liquid crystal layer may be splay-aligned such that a maximum tilt angle θ2 is 20° or more, preferably approximately 20° to 90° from an in-plane direction to a thickness direction, in a liquid crystal tilt angle. Since the maximum tilt angle is less than 20°, viewing angle compensation functions may be insignificant.

In addition, the first liquid crystal layer may be splay-aligned such that an average tilt angle is 35° or more, preferably 35° to 90°. In this case, the average tilt angle refers to an average value of a pretilt angle, an intermediate tilt angle, and a maximum tilt angle. For instance, when a liquid crystal film coated with a thickness of 1 um is divided into three layers, an average tilt angle satisfies (2+3+4+5)/4=3.5°, provided that a pretilt angle is 2°, a tilt angle of a first layer is 3°, a tilt angle of a second layer is 4°, and a tilt angle of a third layer is 5°. The average tilt angle is less than 35°, ECB viewing angle compensation functions may be significantly degraded.

In addition, the first liquid crystal layer may have an in-plane retardation value of approximately 50 nm to 150 nm, and an angle formed by an optical axis of the first base substrate and an optical axis of the first liquid crystal layer may be approximately 40° to 80° or −40° to −80°. When the in-plane retardation value of the first liquid crystal layer and the optical axes thereof satisfy the above numerical ranges, the function of an achromatic quarter wave film (AQWF) may be smoothly performed.

In this case, an in-plane retardation value ($R_{in}$) refers to a value defined as in the following [Equation 2]:

$$R_{in} = d \times (n_x - n_y) \quad \text{[Equation 2]}$$

Where d refers to a thickness of the liquid crystal layer, $n_x$ refers to a refractive index in x-axis direction, and $n_y$ refers to a refractive index in y-axis direction.

Next, the second liquid crystal film 50 will be explained. The second liquid crystal film 50 may be interposed between the second substrate 16 and the second polarizer 30 and be formed of a second substrate 52 and a second liquid crystal layer 54 formed on a surface of the second substrate 52.

In this case, similarly to the first base substrate 42, the second base substrate 52 may be formed of any one of a positive uniaxial film, a negative biaxial film, and an isotropic film. The detailed description of the positive uniaxial film, the negative biaxial film, and the isotropic film is identical to the description thereof as in the first base substrate.

Meanwhile, the second liquid crystal layer 54 is formed of horizontally aligned nematic liquid crystals and has a positive in-plane retardation value. The in-plane retardation value of the second liquid crystal layer 54 may be varied depending on types of the second base substrate, or the like, but may be approximately 50 nm to 150 nm.

The optimum retardation value with which the achromatic quarter wave film is fabricated may be slightly varied, based on the base substrate; however, the range of the retardation value in which the achromatic quarter wave film is fabricated is 50 nm to 150 nm, and substantially unvaried.

In this case, an angle formed by an optical axis in an in-plane direction of the second base substrate and an optical axis of the second liquid crystal layer may be ±40° to ±80°.

Meanwhile, each of the first liquid crystal film and the second liquid crystal film may further include an alignment layer between the base substrate and the liquid crystal layer thereof, the alignment layer imparting alignment to the liquid crystal layer. For convenience, an alignment layer inserted between the first base substrate and the first liquid crystal layer refers to a first alignment layer, and an alignment layer inserted between the second base substrate and the second liquid crystal layer refers to a second alignment layer. As the first alignment layer and/or the second alignment layer, an alignment layer generally used in the related art may be used, for example, a rubbing alignment layer or a photo alignment layer. More specifically, a rubbing alignment layer, such as an acrylic alignment layer, a photo alignment layer including polynorbornene-based cyanate or polyimide-based cyanate, or the like may be used.

In the case of the ECB-LCD configured as above, according to the present invention, since a liquid crystal film having a liquid crystal layer formed on a base substrate film is used as a compensation film, a process of matching angles of two retardation films and combining the retardation films as in the related art may not be required. As a result, the ECB-LCD according to the present invention may be easily manufactured and manufacturing costs thereof may be low, as compared to the case in the related art. In addition, the ECB-LCD configured as above according to the present invention may have excellent viewing angle and color characteristics, as compared to the ECB-LCD according to the related art.

MODE FOR INVENTION

Hereafter, the present invention will be explained in detail through concrete Examples.

Example 1

The front contrast ratio and viewing angle characteristics of an ECB-LCD having a backlight, a first polarizer, a first inner protective film, a first liquid crystal film, an ECB-LCD panel, a second liquid crystal film, a second inner protective film and a second polarizer sequentially arranged in order were measured based on base substrates of the first liquid crystal film and the second liquid crystal film and in-plane retardation values of the liquid crystal layers thereof.

In this case, as the first inner protective film, a TAC film having a thickness of 50 μm and a thickness direction retardation value of −30 nm was used. As the first liquid crystal film, a uniaxially stretched COP film (first base substrate) on which a liquid crystal was splay-aligned and of which a thickness was 270 nm was used. In this case, the first polarizer and an optical axis of the first base substrate were disposed so as to form an angle of −15°, and the optical axis of the first base substrate and an optical axis of the first liquid crystal layer were disposed so as to form an angle of 60°.

In addition, as the second inner protective film, a TAC film having a thickness of 50 μm and a thickness direction retardation value of −30 nm was used. As the second liquid crystal film, a uniaxially stretched COP film (second base substrate) on which a nematic liquid crystal was horizontally aligned and of which a thickness was 270 nm was used. In this case, the second polarizer and an optical axis of the second base substrate were disposed so as to form an angle of 67.5°, and the optical axis of the second base substrate and an optical axis of the second liquid crystal layer are disposed so as to form an angle of −67.5°.

Meanwhile, a retardation value of a liquid crystal cell of the ECB-LCD panel was 330 nm, and the retardation value was measured using a wavelength of 550 nm.

Figure 2:
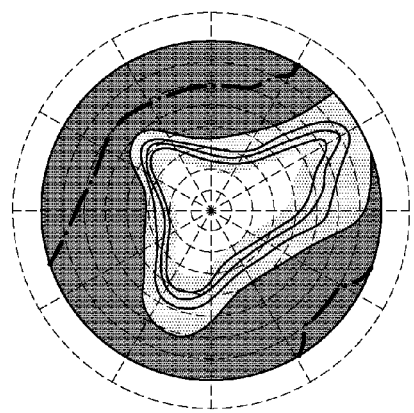
FIG. 2 is a diagram showing viewing angle characteristics of an ECB-LCD according to Example 1 of the present invention.

The measured results are shown in the following [Table 1-1] to [Table 1-5]. Meanwhile, FIG. 2 which illustrates viewing angle characteristics of the ECB-LCD according to Example 1, shows a contrast ratio in a range of an azimuth angle of 0°~360° and a radius vector angle of 0°~80°. A portion indicated by a broken line refers to an area in which the contrast ratio is 10:1 or more.

TABLE 1-1

| First base substrate | First liquid crystal layer | Second base substrate | Second liquid crystal layer | Front Contrast Rate (CR) | Viewing angle | | | |
|---|---|---|---|---|---|---|---|---|
| | | | | | Top | Bottom | Left | Right |
| 270 | 110 | 270 | 100 | 78 | 60 | 70 | 60 | 50 |
| 270 | 110 | 270 | 105 | 132 | 60 | 80 | 70 | 52 |
| 270 | 110 | 270 | 110 | 208 | 62 | 80 | 80 | 58 |
| 270 | 110 | 270 | 115 | 252 | 65 | 80 | 80 | 60 |
| 270 | 110 | 270 | 120 | 198 | 65 | 80 | 80 | 60 |
| 270 | 115 | 270 | 100 | 133 | 62 | 78 | 65 | 55 |
| 270 | 115 | 270 | 105 | 208 | 64 | 80 | 75 | 57 |
| 270 | 115 | 270 | 110 | 250 | 68 | 80 | 80 | 58 |
| 270 | 115 | 270 | 115 | 198 | 68 | 80 | 80 | 60 |
| 270 | 115 | 270 | 120 | 129 | 70 | 80 | 80 | 60 |
| 270 | 120 | 270 | 100 | 133 | 62 | 78 | 65 | 55 |
| 270 | 120 | 270 | 105 | 208 | 64 | 80 | 75 | 57 |
| 270 | 120 | 270 | 110 | 250 | 86 | 80 | 80 | 58 |
| 270 | 120 | 270 | 115 | 198 | 88 | 80 | 80 | 60 |
| 270 | 120 | 270 | 120 | 129 | 70 | 80 | 80 | 60 |

TABLE 1-2

| First base substrate | First liquid crystal layer | Second base substrate | Second liquid crystal layer | Front Contrast Rate (CR) | Viewing angle | | | |
|---|---|---|---|---|---|---|---|---|
| | | | | | Top | Bottom | Left | Right |
| 270 | 110 | 275 | 100 | 56 | 47 | 62 | 49 | 68 |
| 270 | 110 | 275 | 105 | 92 | 48 | 66 | 53 | 71 |
| 270 | 110 | 275 | 110 | 158 | 51 | 71 | 57 | 77 |
| 270 | 110 | 275 | 115 | 244 | 52 | 76 | 59 | 80 |
| 270 | 110 | 275 | 120 | 260 | 56 | 80 | 62 | 80 |
| 270 | 115 | 275 | 100 | 91 | 48 | 73 | 51 | 74 |
| 270 | 115 | 275 | 105 | 155 | 50 | 80 | 54 | 77 |
| 270 | 115 | 275 | 110 | 242 | 53 | 80 | 58 | 80 |
| 270 | 115 | 275 | 115 | 262 | 55 | 80 | 61 | 80 |
| 270 | 115 | 275 | 120 | 185 | 56 | 80 | 65 | 80 |
| 270 | 120 | 275 | 100 | 153 | 50 | 80 | 54 | 79 |
| 270 | 120 | 275 | 105 | 241 | 53 | 80 | 56 | 80 |
| 270 | 120 | 275 | 110 | 262 | 55 | 80 | 58 | 80 |
| 270 | 120 | 275 | 115 | 187 | 57 | 80 | 62 | 80 |
| 270 | 120 | 275 | 120 | 115 | 58 | 80 | 66 | 80 |

TABLE 1-3

| First base substrate | First liquid crystal layer | Second base substrate | Second liquid crystal layer | Front Contrast Rate (CR) | Viewing angle | | | |
|---|---|---|---|---|---|---|---|---|
| | | | | | Top | Bottom | Left | Right |
| 265 | 110 | 265 | 100 | 144 | 60 | 80 | 77 | 56 |
| 265 | 110 | 265 | 105 | 224 | 64 | 80 | 80 | 60 |
| 265 | 110 | 265 | 110 | 249 | 67 | 80 | 80 | 63 |
| 265 | 110 | 265 | 115 | 180 | 69 | 80 | 80 | 63 |
| 265 | 110 | 265 | 120 | 114 | 72 | 80 | 80 | 65 |
| 265 | 115 | 265 | 100 | 223 | 62 | 80 | 80 | 60 |
| 265 | 115 | 265 | 105 | 249 | 55 | 80 | 80 | 62 |
| 265 | 115 | 265 | 110 | 184 | 58 | 80 | 80 | 84 |
| 265 | 115 | 265 | 115 | 116 | 71 | 80 | 80 | 65 |
| 265 | 115 | 265 | 120 | 74 | 74 | 80 | 80 | 86 |
| 265 | 120 | 265 | 100 | 249 | 64 | 80 | 80 | 62 |
| 265 | 120 | 265 | 105 | 186 | 67 | 80 | 80 | 84 |
| 265 | 120 | 265 | 110 | 118 | 70 | 80 | 80 | 66 |
| 265 | 120 | 265 | 115 | 75 | 73 | 80 | 80 | 67 |
| 265 | 120 | 265 | 120 | 51 | 78 | 80 | 80 | 88 |

TABLE 1-4

| First base substrate | First liquid crystal layer | Second base substrate | Second liquid crystal layer | Front Contrast Rate (CR) | Viewing angle | | | |
|---|---|---|---|---|---|---|---|---|
| | | | | | Top | Bottom | Left | Right |
| 270 | 110 | 275 | 100 | 56 | 53 | 77 | 62 | 48 |
| 270 | 110 | 275 | 105 | 91 | 57 | 80 | 67 | 48 |
| 270 | 110 | 275 | 110 | 152 | 61 | 80 | 73 | 53 |
| 270 | 110 | 275 | 115 | 231 | 66 | 80 | 79 | 55 |
| 270 | 110 | 275 | 120 | 242 | 68 | 80 | 80 | 56 |
| 270 | 115 | 275 | 100 | 90 | 55 | 80 | 75 | 50 |
| 270 | 115 | 275 | 105 | 150 | 59 | 80 | 80 | 53 |
| 270 | 115 | 275 | 110 | 230 | 63 | 80 | 80 | 55 |
| 270 | 115 | 275 | 115 | 242 | 66 | 80 | 80 | 57 |
| 270 | 115 | 275 | 120 | 175 | 69 | 80 | 80 | 58 |
| 270 | 120 | 275 | 100 | 149 | 58 | 80 | 80 | 52 |
| 270 | 120 | 275 | 105 | 228 | 61 | 80 | 80 | 54 |
| 270 | 120 | 275 | 110 | 244 | 65 | 80 | 80 | 57 |
| 270 | 120 | 275 | 115 | 177 | 66 | 80 | 80 | 58 |
| 270 | 120 | 275 | 120 | 112 | 70 | 80 | 80 | 50 |

TABLE 1-5

| First base substrate | First liquid crystal layer | Second base substrate | Second liquid crystal layer | Front Contrast Rate (CR) | Viewing angle | | | |
|---|---|---|---|---|---|---|---|---|
| | | | | | Top | Bottom | Left | Right |
| 275 | 110 | 275 | 100 | 45 | 50 | 71 | 59 | 46 |
| 275 | 110 | 275 | 105 | 72 | 55 | 78 | 65 | 48 |
| 275 | 110 | 275 | 110 | 110 | 58 | 80 | 68 | 50 |

TABLE 1-5-continued

| First base substrate | First liquid crystal layer | Second base substrate | Second liquid crystal layer | Front Contrast Rate (CR) | Viewing angle | | | |
|---|---|---|---|---|---|---|---|---|
| | | | | | Top | Bottom | Left | Right |
| 275 | 110 | 275 | 115 | 134 | 61 | 80 | 76 | 54 |
| 275 | 110 | 275 | 120 | 250 | 65 | 80 | 80 | 55 |
| 275 | 115 | 275 | 100 | 70 | 53 | 78 | 71 | 47 |
| 275 | 115 | 275 | 105 | 117 | 57 | 80 | 76 | 51 |
| 275 | 115 | 275 | 110 | 191 | 60 | 80 | 80 | 54 |
| 275 | 115 | 275 | 115 | 251 | 64 | 80 | 80 | 54 |
| 275 | 115 | 275 | 120 | 213 | 68 | 80 | 80 | 57 |
| 275 | 120 | 275 | 100 | 145 | 55 | 77 | 80 | 50 |
| 275 | 120 | 275 | 105 | 189 | 58 | 78 | 80 | 53 |
| 275 | 120 | 275 | 110 | 251 | 62 | 80 | 80 | 55 |
| 275 | 120 | 275 | 115 | 214 | 65 | 80 | 80 | 57 |
| 275 | 120 | 275 | 120 | 140 | 68 | 80 | 80 | 58 |

Example 2

The front contrast ratio and viewing angle characteristics of an ECB-LCD having a backlight, a first polarizer, a first liquid crystal film, an ECB-LCD panel, a second liquid crystal film, and a second polarizer sequentially arranged in order were measured based on base substrates of the first liquid crystal film and the second liquid crystal film and in-plane retardation values of the liquid crystal layers thereof.

In this case, as the first liquid crystal film, a uniaxially stretched COP film (first base substrate) on which a liquid crystal was splay-aligned (first liquid crystal layer) and of which a thickness was 270 nm was used. In this case, the first base substrate was disposed such that an optical axis thereof forms an angle of 67.5°, with respect to an absorption axis of the first polarizer, and an optical axis of the first liquid crystal layer was disposed to be identical to the absorption axis of the first polarizer.

In addition, as the second liquid crystal film, a uniaxially stretched COP film (second base substrate) on which a nematic liquid crystal was horizontally aligned (second liquid crystal layer) and of which a thickness was 270 nm was used. In this case, the second base substrate was disposed such that an optical axis thereof forms an angle of 15° with respect to an absorption axis of the second polarizer, and the second liquid crystal layer was disposed such that an optical axis thereof forms an angle of 60° with respect to the optical axis of the second base substrate.

Meanwhile, a retardation value of a liquid crystal cell of the ECB-LCD panel was 330 nm, and the retardation value was measured using a wavelength of 550 nm.

Figure 3:
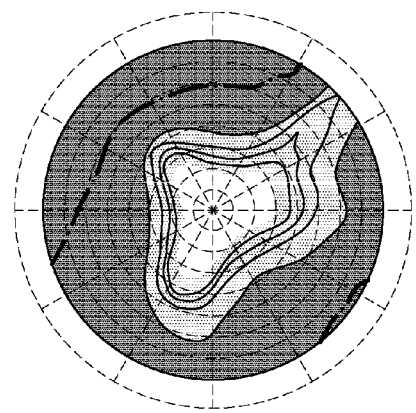
FIG. 3 is a diagram showing viewing angle characteristics of an ECB-LCD according to Example 2 of the present invention.

The measured results are shown in the following [Table 2-1] to [Table 2-7]. Meanwhile, FIG. 3 which illustrates viewing angle characteristics of the ECB-LCD according to Example 2, shows a contrast ratio in a range of an azimuth angle of 0°~360° and a radius vector angle of 0°~80°. A portion indicated by a broken line refers to an area in which the contrast ratio is 10:1 or more.

TABLE 2-1

| First base substrate | First liquid crystal layer | Second base substrate | Second liquid crystal layer | Front Contrast Rate (CR) | Viewing angle | | | |
|---|---|---|---|---|---|---|---|---|
| | | | | | Top | Bottom | Left | Right |
| 270 | 110 | 270 | 100 | 76 | 49 | 68 | 51 | 69 |
| 270 | 110 | 270 | 105 | 129 | 52 | 75 | 54 | 73 |
| 270 | 110 | 270 | 110 | 211 | 54 | 79 | 58 | 78 |
| 270 | 110 | 270 | 115 | 270 | 57 | 80 | 61 | 80 |
| 270 | 110 | 270 | 120 | 214 | 58 | 80 | 64 | 80 |
| 270 | 115 | 270 | 100 | 128 | 52 | 80 | 54 | 75 |
| 270 | 115 | 270 | 105 | 212 | 54 | 80 | 57 | 79 |
| 270 | 115 | 270 | 110 | 271 | 57 | 80 | 59 | 80 |
| 270 | 115 | 270 | 115 | 217 | 57 | 80 | 62 | 80 |
| 270 | 115 | 270 | 120 | 136 | 59 | 80 | 65 | 80 |
| 270 | 120 | 270 | 100 | 203 | 54 | 80 | 55 | 73 |
| 270 | 120 | 270 | 105 | 269 | 56 | 80 | 58 | 80 |
| 270 | 120 | 270 | 110 | 220 | 57 | 80 | 60 | 80 |
| 270 | 120 | 270 | 115 | 138 | 59 | 80 | 65 | 80 |
| 270 | 120 | 270 | 120 | 86 | 60 | 80 | 67 | 80 |

TABLE 2-2

| First base substrate | First liquid crystal layer | Second base substrate | Second liquid crystal layer | Front Contrast Rate (CR) | Viewing angle | | | |
|---|---|---|---|---|---|---|---|---|
| | | | | | Top | Bottom | Left | Right |
| 270 | 110 | 275 | 100 | 56 | 47 | 62 | 49 | 68 |
| 270 | 110 | 275 | 105 | 92 | 48 | 86 | 53 | 71 |
| 270 | 110 | 275 | 110 | 158 | 51 | 71 | 57 | 77 |
| 270 | 110 | 275 | 115 | 244 | 52 | 76 | 59 | 80 |
| 270 | 110 | 275 | 120 | 260 | 56 | 80 | 62 | 80 |
| 270 | 115 | 275 | 100 | 91 | 48 | 73 | 51 | 74 |

TABLE 2-2-continued

| First base substrate | First liquid crystal layer | Second base substrate | Second liquid crystal layer | Front Contrast Rate (CR) | Viewing angle | | | |
|---|---|---|---|---|---|---|---|---|
| | | | | | Top | Bottom | Left | Right |
| 270 | 115 | 275 | 105 | 155 | 50 | 80 | 54 | 77 |
| 270 | 115 | 275 | 110 | 242 | 53 | 80 | 58 | 80 |
| 270 | 115 | 275 | 115 | 262 | 55 | 80 | 61 | 80 |
| 270 | 115 | 275 | 120 | 165 | 56 | 80 | 65 | 80 |
| 270 | 120 | 275 | 100 | 153 | 50 | 80 | 54 | 79 |
| 270 | 120 | 275 | 105 | 241 | 53 | 80 | 56 | 80 |
| 270 | 120 | 275 | 110 | 262 | 55 | 80 | 58 | 80 |
| 270 | 120 | 275 | 115 | 187 | 57 | 60 | 62 | 80 |
| 270 | 120 | 275 | 120 | 115 | 58 | 60 | 66 | 80 |

TABLE 2-3

| First base substrate | First liquid crystal layer | Second base substrate | Second liquid crystal layer | Front Contrast Rate (CR) | Viewing angle | | | |
|---|---|---|---|---|---|---|---|---|
| | | | | | Top | Bottom | Left | Right |
| 275 | 110 | 275 | 100 | 45 | 44 | 59 | 47 | 64 |
| 275 | 110 | 275 | 105 | 72 | 48 | 63 | 50 | 69 |
| 275 | 110 | 275 | 110 | 121 | 49 | 68 | 54 | 73 |
| 275 | 110 | 275 | 115 | 203 | 51 | 72 | 57 | 77 |
| 275 | 110 | 275 | 120 | 270 | 54 | 76 | 60 | 80 |
| 275 | 115 | 275 | 100 | 71 | 47 | 68 | 48 | 70 |
| 275 | 115 | 275 | 105 | 118 | 49 | 75 | 52 | 74 |
| 275 | 115 | 275 | 110 | 200 | 51 | 80 | 56 | 77 |
| 275 | 115 | 275 | 115 | 269 | 54 | 80 | 58 | 80 |
| 275 | 115 | 275 | 120 | 227 | 55 | 80 | 62 | 80 |
| 275 | 120 | 275 | 100 | 118 | 48 | 80 | 51 | 74 |
| 275 | 120 | 275 | 105 | 196 | 51 | 80 | 54 | 77 |
| 275 | 120 | 275 | 110 | 268 | 53 | 80 | 57 | 79 |
| 275 | 120 | 275 | 115 | 229 | 55 | 80 | 60 | 80 |
| 275 | 120 | 275 | 120 | 147 | 57 | 80 | 65 | 80 |

TABLE 2-4

| First base substrate | First liquid crystal layer | Second base substrate | Second liquid crystal layer | Front Contrast Rate (CR) | Viewing angle | | | |
|---|---|---|---|---|---|---|---|---|
| | | | | | Top | Bottom | Left | Right |
| 275 | 110 | 275 | 100 | 45 | 44 | 59 | 47 | 64 |
| 275 | 110 | 275 | 105 | 72 | 48 | 63 | 50 | 69 |
| 275 | 110 | 275 | 110 | 121 | 49 | 68 | 54 | 73 |
| 275 | 110 | 275 | 115 | 203 | 51 | 72 | 57 | 77 |
| 275 | 110 | 275 | 120 | 270 | 54 | 76 | 60 | 80 |
| 275 | 115 | 275 | 100 | 71 | 47 | 68 | 48 | 70 |
| 275 | 115 | 275 | 105 | 118 | 49 | 75 | 52 | 74 |
| 275 | 115 | 275 | 110 | 200 | 51 | 80 | 56 | 77 |
| 275 | 115 | 275 | 115 | 269 | 54 | 80 | 58 | 60 |
| 275 | 115 | 275 | 120 | 227 | 55 | 80 | 62 | 60 |
| 275 | 120 | 275 | 100 | 118 | 48 | 80 | 51 | 74 |
| 275 | 120 | 275 | 105 | 196 | 51 | 80 | 54 | 77 |
| 275 | 120 | 275 | 110 | 268 | 53 | 80 | 57 | 79 |
| 275 | 120 | 275 | 115 | 229 | 55 | 80 | 60 | 80 |
| 275 | 120 | 275 | 120 | 147 | 57 | 80 | 65 | 80 |

TABLE 2-5

| First base substrate | First liquid crystal layer | Second base substrate | Second liquid crystal layer | Front Contrast Rate (CR) | Viewing angle | | | |
|---|---|---|---|---|---|---|---|---|
| | | | | | Top | Bottom | Left | Right |
| 265 | 110 | 265 | 100 | 136 | 56 | 80 | 55 | 75 |
| 265 | 110 | 265 | 105 | 233 | 57 | 80 | 59 | 78 |
| 265 | 110 | 265 | 110 | 267 | 58 | 80 | 61 | 80 |
| 265 | 110 | 265 | 115 | 205 | 60 | 80 | 65 | 80 |
| 265 | 110 | 265 | 120 | 127 | 62 | 80 | 68 | 80 |
| 265 | 115 | 265 | 100 | 223 | 57 | 80 | 57 | 80 |
| 265 | 115 | 265 | 105 | 288 | 58 | 80 | 59 | 80 |
| 265 | 115 | 265 | 110 | 208 | 59 | 80 | 63 | 80 |
| 265 | 115 | 265 | 115 | 129 | 62 | 80 | 65 | 80 |

TABLE 2-5-continued

| First base substrate | First liquid crystal layer | Second base substrate | Second liquid crystal layer | Front Contrast Rate (CR) | Top | Bottom | Left | Right |
|---|---|---|---|---|---|---|---|---|
| 265 | 115 | 265 | 120 | 81 | 64 | 80 | 66 | 80 |
| 265 | 120 | 265 | 100 | 270 | 59 | 80 | 58 | 80 |
| 265 | 120 | 265 | 105 | 209 | 60 | 80 | 61 | 80 |
| 265 | 120 | 265 | 110 | 130 | 62 | 80 | 64 | 80 |
| 265 | 120 | 265 | 115 | 82 | 64 | 80 | 67 | 80 |
| 265 | 120 | 265 | 120 | 54 | 65 | 80 | 69 | 80 |

TABLE 2-6

| First base substrate | First liquid crystal layer | Second base substrate | Second liquid crystal layer | Front Contrast Rate (CR) | Top | Bottom | Left | Right |
|---|---|---|---|---|---|---|---|---|
| 260 | 110 | 265 | 100 | 177 | 57 | 80 | 57 | 78 |
| 260 | 110 | 265 | 105 | 260 | 59 | 80 | 59 | 80 |
| 260 | 110 | 265 | 110 | 248 | 60 | 80 | 63 | 80 |
| 260 | 110 | 265 | 115 | 164 | 62 | 80 | 66 | 80 |
| 260 | 110 | 265 | 120 | 101 | 64 | 80 | 69 | 80 |
| 260 | 115 | 265 | 100 | 259 | 58 | 80 | 58 | 80 |
| 260 | 115 | 265 | 105 | 249 | 61 | 80 | 62 | 80 |
| 260 | 115 | 265 | 110 | 165 | 63 | 80 | 65 | 80 |
| 260 | 115 | 265 | 115 | 102 | 64 | 80 | 63 | 80 |
| 260 | 115 | 265 | 120 | 56 | 65 | 80 | 70 | 80 |
| 260 | 120 | 265 | 100 | 250 | 60 | 80 | 60 | 80 |
| 260 | 120 | 265 | 105 | 168 | 62 | 80 | 64 | 80 |
| 260 | 120 | 265 | 110 | 103 | 64 | 80 | 67 | 80 |
| 260 | 120 | 265 | 115 | 67 | 65 | 80 | 68 | 80 |
| 260 | 120 | 265 | 120 | 46 | 67 | 80 | 71 | 80 |

TABLE 2-7

| First base substrate | First liquid crystal layer | Second base substrate | Second liquid crystal layer | Front Contrast Rate (CR) | Top | Bottom | Left | Right |
|---|---|---|---|---|---|---|---|---|
| 260 | 110 | 260 | 100 | 235 | 60 | 80 | 58 | 80 |
| 260 | 110 | 260 | 105 | 267 | 62 | 80 | 62 | 80 |
| 260 | 110 | 260 | 110 | 195 | 64 | 80 | 65 | 80 |
| 260 | 110 | 260 | 115 | 120 | 65 | 80 | 68 | 80 |
| 260 | 110 | 260 | 120 | 76 | 67 | 80 | 71 | 80 |
| 260 | 115 | 260 | 100 | 268 | 62 | 80 | 59 | 80 |
| 260 | 115 | 260 | 105 | 197 | 65 | 80 | 64 | 80 |
| 260 | 115 | 260 | 110 | 122 | 65 | 80 | 67 | 80 |
| 260 | 115 | 260 | 115 | 77 | 68 | 80 | 69 | 80 |
| 260 | 115 | 260 | 120 | 52 | 68 | 80 | 71 | 80 |
| 260 | 120 | 260 | 100 | 188 | 64 | 80 | 62 | 80 |
| 260 | 120 | 260 | 105 | 124 | 67 | 80 | 65 | 80 |
| 260 | 120 | 260 | 110 | 78 | 68 | 80 | 67 | 80 |
| 260 | 120 | 260 | 115 | 52 | 68 | 80 | 70 | 80 |
| 270 | 120 | 260 | 120 | 37 | 63 | 80 | 74 | 80 |

Comparative Example

For comparison, the front contrast ratio (CR) and viewing angle characteristics of an ECB-LCD in the case of using compensation films according to the related art were measured. In this case, as the compensation film disposed on an upper polarizing plate, a combination of a ½ wavelength plate having an in-plane retardation value of 270 nm and a ¼ wavelength plate having an in-plane retardation value of 110 nm was used. As the compensation film disposed under a lower polarizing plate, a combination of a ½ wavelength plate having an in-plane retardation value of 270 nm and a ¼ wavelength plate formed of a splay-aligned liquid crystal film was used. In the compensation film disposed on the upper polarizing plate, optical axes of the ½ wavelength plate and ¼ wavelength plate were disposed so as to form an angle of 60°. In the compensation film disposed under the lower polarizing plate, optical axes of the ½ wavelength plate and ¼ wavelength plate were disposed so as to form an angle of 67.5°.

The front contrast ratio (CR) of the ECB-LCD using the above compensation film according to the related art was 237:1, and the viewing angle characteristics thereof are shown in the following [Table 3].

TABLE 3

| Upper polarizing plate retardation film 1 | Upper polarizing plate retardation film 2 | Lower polarizing plate retardation film 1 | Lower polarizing plate NR film 1 | Front contrast ratio (CR) | Viewing angle | | | |
|---|---|---|---|---|---|---|---|---|
| | | | | | Top | Bottom | left | Right |
| 270 nm | 110 nm | 270 nm | 110 nm | 237 | 58 | 80 | 72 | 80 |

As shown in the [Table 1] to [Table 3], the ECB-LCDs according to Examples 1 and 2 have optical characteristics equal to or greater than those of the ECB-LCD according to the Comparative Example, and allow for a reduction in manufacturing costs through minimized cutting loss due to integrating the retardation film and the liquid crystal film.

While the present invention has been shown and described in connection with the embodiments, it will be apparent to those skilled in the art that modifications and variations can be made without departing from the spirit and scope of the invention as defined by the appended claims.

The invention claimed is:

1. An electrically controllable birefringence liquid crystal display (ECB-LCD) device, comprising:
   a liquid crystal panel including a first substrate, a second substrate, and a liquid crystal cell interposed between the first substrate and the second substrate and including a liquid crystal having positive dielectric anisotropy, the liquid crystal cell having a cell gap of 1 to 5 μm and operating in an ECB mode;
   a first polarizer disposed on an upper portion of the first substrate and having a first absorption axis;
   a second polarizer disposed on a lower portion of the second substrate and having a second absorption axis;
   a first liquid crystal film interposed between the first substrate and the first polarizer; and
   a second liquid crystal film interposed between the second substrate and the second polarizer;
   wherein the first liquid crystal film includes a first base substrate; and a first liquid crystal layer formed on a surface of the first base substrate and including a nematic liquid crystal splay-aligned such that a maximum tilt angle is 20° to 90° from an in-plane direction to a thickness direction; and
   wherein the second liquid crystal film includes a second base substrate; and a second liquid crystal layer formed on a surface of the second base substrate and including a horizontally aligned nematic liquid crystal,
   wherein axes of the first base substrate and the first liquid crystal layer form an angle of 40° to 80° or −40° to −80°.

2. The ECB-LCD device of claim 1, wherein the first base substrate or the second base substrate is a uniaxial retardation film, a negative biaxial retardation film, or an isotropic film.

3. The ECB-LCD device of claim 2, wherein the uniaxial retardation film is one selected from a group consisting of a uniaxially stretched cyclo olefin polymer (COP) film, a uniaxially stretched polycarbonate (PC) film, and a uniaxially stretched acrylate film.

4. The ECB-LCD device of claim 2, wherein the negative biaxial retardation film is one selected from a group consisting of a biaxially stretched COP film, a uniaxially stretched triacetyl cellulose (TAC) film, a biaxially stretched polycarbonate (PC) film and a biaxially stretched poly methyl methacrylate (PMMA) film.

5. The ECB-LCD device of claim 4, wherein the negative biaxial retardation film has an in-plane retardation value of 200 nm to 300 nm and a thickness direction retardation value of −5 nm to −100 nm at a wavelength of 550 nm.

6. The ECB-LCD device of claim 2, wherein the isotropic film is one selected from a group consisting of a non-stretched COP film, a non-stretched acrylate film, and a non-stretched PMMA film.

7. The ECB-LCD device of claim 2, wherein the uniaxial retardation film has an in-plane retardation value of 200 nm to 300 nm at a wavelength of 550 nm.

8. The ECB-LCD device of claim 1, wherein the respective first liquid crystal layer and the second liquid crystal layer have an in-plane retardation value of 50 nm to 150 nm at a wavelength of 550 nm.

9. The ECB-LCD device of claim 1, wherein axes of the second base substrate and the second liquid crystal layer form an angle of 40° to 80° or −40° to −80°.

10. The ECB-LCD device of claim 1, further comprising a first alignment layer between the first base substrate and the first liquid crystal layer.

11. The ECB-LCD device of claim 1, further comprising a second alignment layer between the second base substrate and the second liquid crystal layer.

12. The ECB-LCD device of claim 10, wherein the first alignment layer is an acrylic alignment layer.

13. The ECB-LCD device of claim 11, wherein the second alignment layer is an acrylic alignment layer.

14. The ECB-LCD device of claim 10, wherein the first alignment layer is a photo alignment layer.

15. The ECB-LCD device of claim 11, wherein the second alignment layer is a photo alignment layer.

16. The ECB-LCD device of claim 14, wherein the photo alignment layer includes polynorbornene-based cyanate or polyimide-based cyanate.

17. The ECB-LCD device of claim 15, wherein the photo alignment layer includes polynorbornene-based cyanate or polyimide-based cyanate.

18. The ECB-LCD device of claim 1, wherein an inner protective film is inserted between the first polarizer and the first liquid crystal film and between the second polarizer and the second liquid crystal film.

19. The ECB-LCD device of claim 1, wherein in the first liquidcrystal layer, an average tilt angle of the nematic liquid crystal is 35° or more.

20. An electrically controllable birefringence liquid crystal display (ECB-LCD) device, comprising:
   a liquid crystal panel including a first substrate, a second substrate, and a liquid crystal cell interposed between the first substrate and the second substrate and including a liquid crystal having positive dielectric anisotropy, the liquid crystal cell having a cell gap of 1 to 5 μm and operating in an ECB mode;
   a first polarizer disposed on an upper portion of the first substrate and having a first absorption axis;
   a second polarizer disposed on a lower portion of the second substrate and having a second absorption axis;
   a first liquid crystal film interposed between the first substrate and the first polarizer; and
   a second liquid crystal film interposed between the second substrate and the second polarizer;

wherein the first liquid crystal film includes a first base substrate made of a uniaxial retardation film having an in-plane retardation value of 200 nm to 300 nm at a wavelength of 550 nm; and a first liquid crystal layer including a nematic liquid crystal splay-aligned on the first base substrate such that a maximum tilt angle is 20° to 90° from an in-plane direction to a thickness direction, and having an optical axis which forms an angle of 40° to 80° or −40° to −80° with respect to an optical axis of the first base substrate and an in-plane retardation value of 50 nm to 150 nm; and wherein the second liquid crystal film includes a second base substrate made of a uniaxial retardation film having an in-plane retardation value of 200 nm to 300 nm at a wavelength of 550 nm; and a second liquid crystal layer including a horizontally aligned nematic liquid crystal on the second base substrate, and having an optical axis which forms an angle of 40° to 80° or −40° to −80° with respect to an optical axis of the second base substrate and an in-plane retardation value of 50 nm to 150 nm.

21. The ECB-LCD device of claim 20, wherein an inner protective film is inserted between the first polarizer and the first liquid crystal film and between the second polarizer and the second liquid crystal film.

22. The ECB-LCD device of claim 20, wherein in the first liquid crystal layer, an average tilt angle of the nematic liquid crystal is 35° or more.

* * * * *